United States Patent
Umezawa et al.

(10) Patent No.: US 7,955,723 B2
(45) Date of Patent: Jun. 7, 2011

(54) MAGNETIC RECORDING MEDIUM SUBSTRATE AND PERPENDICULAR MAGNETIC RECORDING MEDIUM

(75) Inventors: Teiichiro Umezawa, Tokyo (JP); Yoshiaki Sonobe, Tokyo (JP); Kong Kim, Tokyo (JP)

(73) Assignee: WD Media (Singapore) Pte.Ltd., Singapore (SG)

( * ) Notice: Subject to any disclaimer, the term of this patent is extended or adjusted under 35 U.S.C. 154(b) by 622 days.

(21) Appl. No.: 11/887,539

(22) PCT Filed: Mar. 27, 2006

(86) PCT No.: PCT/JP2006/306148
§ 371 (c)(1), (2), (4) Date: Jun. 24, 2008

(87) PCT Pub. No.: WO2006/106628
PCT Pub. Date: Oct. 12, 2006

(65) Prior Publication Data
US 2010/0203358 A1    Aug. 12, 2010

(30) Foreign Application Priority Data
Mar. 31, 2005   (JP) .................................. 2005-102422

(51) Int. Cl.
*G11B 5/66*   (2006.01)
*B32B 5/16*   (2006.01)

(52) U.S. Cl. ................ 428/829; 428/828; 428/832.1; 428/828.1; 360/135; 360/66

(58) Field of Classification Search .............. 428/848, 428/848.9, 692, 848.1, 829, 828, 832.1; 360/66, 360/314, 135; 338/32 R; 375/240.03
See application file for complete search history.

(56) References Cited

U.S. PATENT DOCUMENTS

| | | | |
|---|---|---|---|
| 2002/0055016 A1* | 5/2002 | Hiramoto et al. | 428/692 |
| 2002/0086185 A1* | 7/2002 | Yasui et al. | 428/848 |
| 2002/0127433 A1 | 9/2002 | Shimizu et al. | |
| 2002/0197514 A1* | 12/2002 | Tanahashi et al. | 428/846 |
| 2004/0033390 A1* | 2/2004 | Oikawa et al. | 428/848 |
| 2004/0058197 A1* | 3/2004 | Nakamura et al. | 428/848 |
| 2004/0233565 A1* | 11/2004 | Arai et al. | 360/66 |

(Continued)

FOREIGN PATENT DOCUMENTS
DE    10 2004 025 085 A1    12/2004
(Continued)

OTHER PUBLICATIONS
Singapore Office Action, dated Oct. 5, 2009 (searched by Austrian Patent Office) and Search Report and Written Opinion corresponding to Singapore Application No. 200708992-3.
(Continued)

*Primary Examiner* — Kevin M. Bernatz
*Assistant Examiner* — Louis Falasco

(57) ABSTRACT

A perpendicular magnetic recording medium comprising a pair of soft magnetic layers that are laminated via a non-magnetic layer and antiparallel-coupled to each other and that are provided between a non-magnetic substrate and a magnetic recording layer, wherein spike noise and medium noise can be positively suppressed when information recording and reproduction are carried out at high recording surface density. At least one pair of soft magnetic layers are laid and formed via a non-magnetic layer on a substrate of a non-magnetic material so that magnetic characteristics obtained by integrating the pair of soft magnetic layers have a magnetic hysteresis to thereby prevent the formation of a magnetic domain wall.

13 Claims, 2 Drawing Sheets

U.S. PATENT DOCUMENTS

| | | |
|---|---|---|
| 2004/0234818 A1 | 11/2004 | Tanahashi et al. |
| 2004/0257192 A1* | 12/2004 | Mori et al. .................. 338/32 R |
| 2005/0008902 A1* | 1/2005 | Bertero et al. ................ 428/848 |
| 2005/0237674 A1* | 10/2005 | Shimazawa et al. .......... 360/314 |

FOREIGN PATENT DOCUMENTS

| | | |
|---|---|---|
| JP | 2001-331920 A | 11/2001 |
| JP | 2004-348849 A | 12/2004 |
| JP | 2004-348952 A | 12/2004 |

OTHER PUBLICATIONS

Reiko Arai, et al., "Suppression of Spike Noise in Anti-parallel Coupled Soft Magnetic Underlayer with Exchange Bias", The 28$^{th}$ Magnetics Society of Japan, Scientific Conference Summary, 2004, pp. 612-613.

* cited by examiner

MAGNETIC RECORDING MEDIUM SUBSTRATE AND PERPENDICULAR MAGNETIC RECORDING MEDIUM

TECHNICAL FIELD

This invention relates to a magnetic recording medium substrate for forming a perpendicular magnetic recording medium adapted to be mounted in a perpendicular magnetic recording type HDD (hard disk drive) or the like.

Further, this invention relates to a perpendicular magnetic recording medium adapted to be mounted in a perpendicular magnetic recording type HDD (hard disk drive) or the like.

BACKGROUND ART

In recent years, there have been proposed various information processing systems following the advancement of information-oriented society and there have been proposed information recording devices for use in those information processing systems. In such information recording devices, there have been required larger information recording capacities and higher information recording densities for the purpose of miniaturization and higher performances of the information processing systems.

In magnetic recording devices, as such information recording devices, represented by HDDs (hard disk drives) using magnetic recording media as recording media, the information recording capacity exceeding 30 GB (gigabytes) has been required per 2.5-inch magnetic disk.

In order to improve the information recording capacity of a magnetic recording medium, it is necessary to improve the performances of both the magnetic recording medium and a magnetic head that records/reproduces an information signal with respect to this magnetic recording medium. In order to satisfy such a requirement with a magnetic recording medium, it is necessary to realize an areal information recording density exceeding 60 gigabits per inch$^2$ (60 Gbits/inch$^2$).

Incidentally, in magnetic recording devices currently widely used, use is made of a magnetic recording medium comprising a magnetic recording layer of the so-called in-plane magnetic recording type (longitudinal magnetic recording type or horizontal magnetic recording type). In this in-plane magnetic recording type, the magnetization direction in the magnetic recording layer becomes a direction approximately parallel to the main surface portion of the magnetic recording medium.

In the in-plane magnetic recording type, there is a possibility that even if attempting to perform information recording at high areal recording density such as 60 gigabits per inch$^2$ by decreasing the size of crystal grains in a magnetic recording layer, the influence of demagnetization fields between the adjacent crystal grains increases so that satisfactory recording cannot be carried out. Further, since it is necessary to reduce the thickness of a magnetic recording layer for decreasing the size of crystal grains in the magnetic recording layer, there is a problem that thermal fluctuation failure tends to occur due to thermal magnetic aftereffect. If the thermal fluctuation failure becomes significant, recording magnetization is attenuated with the lapse of time and, finally, recorded information cannot be normally reproduced.

In view of this, in recent years, it has been proposed to employ the perpendicular magnetic recording type, instead of the in-plane magnetic recording type, in magnetic recording media. In the perpendicular magnetic recording type, even if the areal recording density is increased, the resistance to thermal fluctuation failure is high. Therefore, the perpendicular magnetic recording type is a desirable recording/reproducing type for achieving information recording at high areal recording density.

In order to employ the perpendicular magnetic recording type instead of the in-plane magnetic recording type in magnetic recording media, it is necessary to largely change the structure of a magnetic recording layer. That is, in a perpendicular magnetic recording medium employing the perpendicular magnetic recording type, it is necessary to orient an easy magnetization axis of a magnetic recording layer being a hard magnetic layer in a perpendicular direction (normal direction) with respect to the main surface of the magnetic recording medium. For example, in the case of forming a magnetic recording layer using a cobalt (Co)-based ferromagnetic material, the easy magnetization axis of the magnetic recording layer becomes the c-axis in the hexagonal closest packed (hcp) crystal structure of cobalt. Therefore, in this case, it is necessary to orient the c-axis of the cobalt crystal structure in a perpendicular direction with respect to the main surface of the magnetic recording medium.

There has been proposed, as such a perpendicular magnetic recording medium, a so-called two-layer type perpendicular magnetic recording medium having a soft magnetic layer made of a soft magnetic substance or ferromagnetic microcrystal on a nonmagnetic substrate and further having a magnetic recording layer made of a hard magnetic substance on the soft magnetic layer. This soft magnetic layer serves to conduct magnetic flux emitted from a magnetic head and perpendicularly transmitted through the magnetic recording layer or magnetic flux perpendicularly emitted from the magnetic recording layer, to a magnetic path leading to the magnetic head. That is, in such a two-layer type perpendicular magnetic recording medium, a suitable magnetic circuit can be formed among the magnetic head, the magnetic recording layer, and the soft magnetic layer at the time of magnetic recording, so that it is possible to obtain an action wherein the soft magnetic layer assists the magnetic recording based on the mirror image effect. Therefore, providing the soft magnetic layer between the nonmagnetic substrate and the magnetic recording layer is considered to be a desirable structure as a perpendicular magnetic recording medium.

In the meantime, a reduction in noise has conventionally been an aim in perpendicular magnetic recording media and is essential also in the perpendicular magnetic recording medium having the soft magnetic layer between the nonmagnetic substrate and the magnetic recording layer. This noise is generated from both the magnetic recording layer and the soft magnetic layer and, particularly, spike-like noise (spike noise) generated from the soft magnetic layer and medium noise have been a problem.

In view of this, proposals have conventionally been made for reducing such noise. For example, Patent Document 1 describes a perpendicular magnetic recording medium having a backing magnetic layer between a nonmagnetic substrate and a magnetic recording layer, wherein the backing magnetic layer comprises a pair of ferromagnetic films having the same thickness and laminated through a nonmagnetic layer therebetween.

In this perpendicular magnetic recording medium, the pair of ferromagnetic films of the backing magnetic layer are antiparallel-coupled to each other and, according to Patent Document 1, it is described that leakage magnetic flux generated from magnetic domain walls in the backing magnetic layer is prevented from entering a magnetic head and the magnetic domain walls in the backing magnetic layer are fixed so as not to move easily, so that medium noise caused by the backing magnetic layer is reduced.

Patent Document 2 describes a perpendicular magnetic recording medium having a soft magnetic underlayer between a nonmagnetic substrate and a magnetic recording layer. This soft magnetic underlayer comprises a first soft magnetic layer, a magnetic domain control layer including at least an antiferromagnetic layer, and a second soft magnetic layer. In this perpendicular magnetic recording medium, the ratio (d1/d2) between a thickness d1 of the first soft magnetic layer and a thickness d2 of the second soft magnetic layer is set to or more and or less.

In this perpendicular magnetic recording medium, in the case of being formed as a perpendicular magnetic recording disk, if a magnetic field is applied in a radial direction of the nonmagnetic substrate, since the soft magnetic underlayer has the magnetic domain control layer including the antiferromagnetic layer, a magnetization curve of the soft magnetic underlayer shifts in the magnetic field direction. Since a coercive force Hc of the soft magnetic underlayer derived from this magnetization curve is smaller than an exchange bias magnetic field (shift amount) Hex, the magnetization does not take a single value in a zero magnetic field, that is, the hysteresis of the magnetization curve does not cross the zero magnetic field.

According to Patent Document 2, it is described that because of the fact that the hysteresis of the magnetization curve does not cross the zero magnetic field, a uniaxial magnetic anisotropy with its easy magnetization axis in the radial direction of the nonmagnetic substrate and a unidirectional magnetic anisotropy with its easy magnetization direction being the direction of the magnetic field are produced in the soft magnetic underlayer, so that magnetic domain walls in the soft magnetic underlayer are driven to an end portion side of the nonmagnetic substrate to provide a pseudo-single-domain state, thereby suppressing generation of spike noise in a data area.

Further, Non-Patent Document 1 describes a perpendicular magnetic recording medium having a pair of soft magnetic layers, laminated through a nonmagnetic layer therebetween, between a nonmagnetic substrate and a magnetic recording layer. In this perpendicular magnetic recording medium, the pair of soft magnetic layers are antiparallel-coupled to each other. According to Non-Patent Document 1, it is described that spike noise is suppressed when the thicknesses of the soft magnetic layers are equal to each other, while, spike noise is generated when a difference in thickness between the soft magnetic layers increases.

Patent Document 1: Japanese Unexamined Patent Application Publication (JP-A) No. 2001-331920
Patent Document 2: Japanese Unexamined Patent Application Publication (JP-A) No. 2004-348849
Non-Patent Document 1: The 28th Magnetics Society of Japan Scientific Conference Summaries (2004) pp. 612 to 613

DISCLOSURE OF THE INVENTION

Problem to be Solved by the Invention

In the meantime, an areal information recording density of 100 Gbits per inch$^2$ (100 Gbits/inch$^2$) or more is becoming required in recent recording media. In order to realize a perpendicular magnetic recording medium capable of satisfactorily carrying out information recording and reproduction at such a high areal recording density, it becomes necessary to further suppress spike noise and medium noise.

In the case where, as described in the foregoing Non-Patent Document 1, the pair of soft magnetic layers laminated through the nonmagnetic layer therebetween and antiparallel-coupled to each other are provided between the nonmagnetic substrate and the magnetic recording layer and the thicknesses of the soft magnetic layers are set equal to each other in the perpendicular magnetic recording medium, spike noise is certainly reduced. However, in this case, it is confirmed from optical observation that magnetic domains are discontinuous and thus magnetic domain walls are formed in the soft magnetic layers and, therefore, it is considered that medium noise increases.

When carrying out information recording and reproduction at a high areal recording density of 100 Gbits per inch$^2$ or more in such a perpendicular magnetic recording medium, if the magnetic domain walls are formed in the soft magnetic layers, there is a possibility that these magnetic domain walls cause noise generation.

Therefore, this invention is proposed in view of the foregoing circumstances and has an object to provide a perpendicular magnetic recording medium having, between a nonmagnetic substrate and a magnetic recording layer, a pair of soft magnetic layers laminated through a nonmagnetic layer therebetween, which can reliably suppress medium noise even when carrying out information recording and reproduction at high areal recording density, and further to provide a magnetic recording medium substrate that can form such a perpendicular magnetic recording medium.

Means for Solving the Problem

The present inventors have advanced studies for solving the foregoing problems and, as a result, have found that, in a perpendicular magnetic recording medium having, between a nonmagnetic substrate and a magnetic recording layer, a pair of soft magnetic layers laminated through a nonmagnetic layer therebetween, it is possible to remove a cause of generation of medium noise by setting a difference in thickness between the soft magnetic layers to a proper value to prevent formation of a magnetic domain wall.

Normally, spike noise in a perpendicular magnetic recording medium is noise caused by a soft magnetic layer and is observed in a low-frequency region. This is caused by movement of magnetic domain walls and is also called Barkhausen noise. On the other hand, medium noise is noise generated in a high-frequency region and is caused by a distribution of radii or sizes of magnetic grains. In AFC soft magnetic layers having the same thickness, magnetic domain walls are observed by an OSA. In Non-Patent Document 1, spike noise is suppressed by fixing magnetic domain walls with the structure of AFC+AFM (antiferromagnetic coupling) soft magnetic layers. On the other hand, soft magnetic layers in this invention form no magnetic domain wall even without an AMF layer and thus can reduce spike noise. That is, although, normally, spike noise cannot be completely removed only with the AFC structure, if a pair of soft magnetic layers laminated through a nonmagnetic layer therebetween has a magnetic hysteresis as in this invention, no magnetic domain wall is formed and thus it is possible to completely remove spike noise. Further, since no magnetic domain wall is formed, medium noise can also be removed.

In this invention, it is considered that magnetic energy and magnetic domain walls are suppressed by the magnetic hysteresis. Therefore, since it is sufficient that the pair of soft magnetic layers laminated through the nonmagnetic layer therebetween have the magnetic hysteresis, the magnetic properties of the pair of soft magnetic layers are not necessarily the same as each other. It is also possible to configure that a magnetic hysteresis is achieved by setting the thicknesses of a pair of soft magnetic layers having different magnetic properties to be equal to each other. Further, soft magnetic layers may be formed by a plurality of layers, not limited to a pair of layers. Further, in the AFC structure of the soft magnetic layers, in order to cancel magnetizations of the upper and lower soft magnetic layers, it is important that the products of Ms and the thickness (=Ms·t) be equal to each other in the upper and lower soft magnetic layers. That is, it may be configured such that the lower soft magnetic layer is increased in Ms and reduced in thickness, while, the upper soft magnetic layer is reduced in Ms and increased in thickness.

That is, this invention has any one of the following structures.

(Sturcture 1)

A magnetic recording medium substrate having an underlayer on a substrate made of a nonmagnetic material is characterized in that the underlayer includes at least a pair of soft magnetic layers laminated through a nonmagnetic layer therebetween and has a magnetic hysteresis.

(Sturcture 2)

A magnetic recording medium substrate having Sturcture 1 is characterized in that the pair of soft magnetic layers are formed to have magnetic properties substantially equal to each other and one of the layers has a thickness different from that of the other layer, wherein a difference between the thicknesses is 10 nm or less.

(Sturcture 3)

A magnetic recording medium substrate having Structure 1 or 2 is characterized in that the soft magnetic layers are magnetically antiparallel-coupled to each other.

(Sturcture 4)

A perpendicular magnetic recording medium having an underlayer and a recording layer on a substrate made of a nonmagnetic material is characterized in that the underlayer includes at least a pair of soft magnetic layers laminated through a nonmagnetic layer therebetween and has a magnetic hysteresis.

(Sturcture 5)

A perpendicular magnetic recording medium having Sturcture 4 is characterized in that the pair of soft magnetic layers are formed to have magnetic properties substantially equal to each other and thicknesses thereof are different from each other.

(Sturcture 6)

A perpendicular magnetic recording medium having Sturcture 5 is characterized in that a difference between the thicknesses of the pair of soft magnetic layers is 10 nm or less.

(Sturcture 7)

A perpendicular magnetic recording medium having any one of Structures 4 to 6 is characterized in that the pair of soft magnetic layers are amorphous.

Effect of the Invention

The magnetic recording medium substrate or the perpendicular magnetic recording medium according to this invention has, on the substrate made of the nonmagnetic material, the underlayer comprising at least the pair of soft magnetic layers which are laminated through the nonmagnetic layer therebetween and having the magnetic hysteresis. Therefore, it is possible to prevent formation of a magnetic domain wall in the underlayer and thus to suppress generation of medium noise.

Further, in the magnetic recording medium substrate or the perpendicular magnetic recording medium according to this invention, the pair of soft magnetic layers are formed to have the magnetic properties substantially equal to each other and the thicknesses thereof are different from each other. Therefore, it is possible to satisfactorily prevent formation of a magnetic domain wall in the soft magnetic layers and thus to suppress generation of medium noise.

Further, in the magnetic recording medium substrate or the perpendicular magnetic recording medium according to this invention, the difference between the thicknesses of the pair of soft magnetic layers is 10 nm or less. Therefore, it is possible to prevent generation of spike noise in the soft magnetic layers.

In the perpendicular magnetic recording medium according to this invention, a suitable magnetic circuit is formed among a magnetic head, the magnetic recording layer, and the soft magnetic layers, so that it is possible to carry out information recording and reproduction at high areal recording density.

That is, this invention can provide a perpendicular magnetic recording medium having, between a nonmagnetic substrate and a magnetic recording layer, a pair of soft magnetic layers laminated through a nonmagnetic layer therebetween, which can reliably suppress medium noise even when carrying out information recording and reproduction at high areal recording density, and further provide a magnetic recording medium substrate that can form such a perpendicular magnetic recording medium, thereby contributing to an increase in areal recording density in perpendicular magnetic recording media.

DESCRIPTION OF SYMBOLS 1 substrate
2 first soft magnetic layer
3 second soft magnetic layer
4 perpendicular magnetic recording layer
5 nonmagnetic layer Best Mode for Carrying Out the Invention Hereinbelow, the best mode for carrying out this invention will be described with reference to the drawings.

A perpendicular magnetic recording medium according to this invention is formed, for example, as a magnetic disk adapted to be mounted in an HDD (hard disk drive) or the like and is a recording medium of the perpendicular magnetic recording type capable of carrying out high-density information signal recording and reproduction.

The perpendicular magnetic recording medium according to this invention, in the form of the magnetic disk, is manufactured to have a predetermined diameter such as, for example, 0.85 inches, 1.0 inches, 1.8 inches, 2.5 inches, or 3.5 inches.

Figure 1:
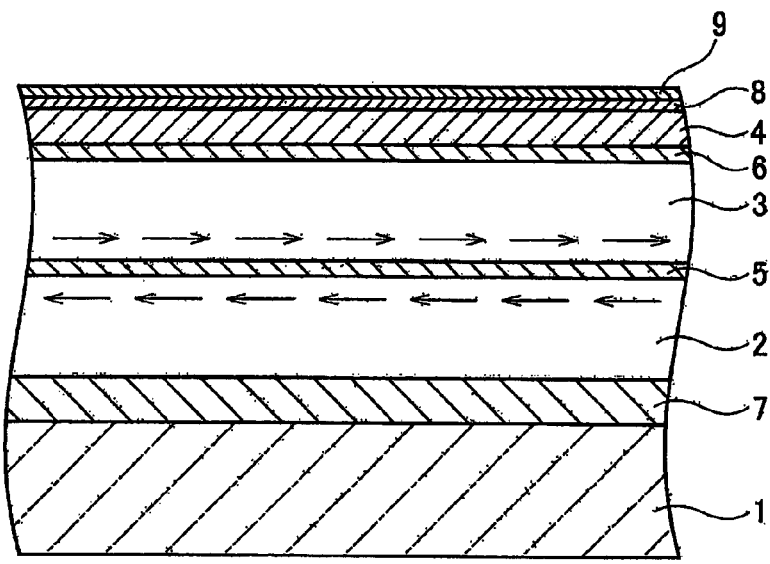
FIG. 1 is a sectional view showing the structure of a perpendicular magnetic recording medium according to this invention.

FIG. 1 is a sectional view showing the structure of a perpendicular magnetic recording medium according to this invention.

As shown in FIG. 1, the perpendicular magnetic recording medium is configured such that an underlayer is formed on a substrate 1 made of a nonmagnetic material and a perpendicular magnetic recording layer 4 is formed as an upper layer with respect to the underlayer. The underlayer is formed so as to include at least first and second soft magnetic layers 2 and 3 forming a pair. A nonmagnetic layer 5 is formed between the soft magnetic layers 2 and 3. That is, the first and second soft magnetic layers 2 and 3 are laminated together through the nonmagnetic layer 5 therebetween. Further, a nonmagnetic underlayer 6 is formed between the upper-side second soft magnetic layer 3 and the perpendicular magnetic recording layer 4. This nonmagnetic underlayer 6 is a layer for crystal control of the perpendicular magnetic recording layer 4.

In this perpendicular magnetic recording medium, the first soft magnetic layer 2, the nonmagnetic layer 5, and the second soft magnetic layer 3 form the underlayer, and this underlayer, the nonmagnetic underlayer 6, and the substrate 1 form a magnetic recording medium substrate. Then, the perpendicular magnetic recording layer 4 and films as upper layers with respect to the perpendicular magnetic recording layer 4 are formed on the magnetic recording medium substrate, thereby forming the perpendicular magnetic recording medium.

In the underlayer of the magnetic recording medium substrate, soft magnetic layers are not limited to the first and second soft magnetic layers 2 and 3, but may further include third and subsequent soft magnetic layers.

As the substrate 1, use can be made of a glass substrate comprised of a glass such as an amorphous glass. As the glass material forming the substrate 1, a chemically strengthened glass obtained by chemically strengthening an aluminosilicate glass is preferable.

The first soft magnetic layer 2 is formed on the substrate 1 through an adhesive layer 7 therebetween. The thickness of the first soft magnetic layer 2 is about 40 nm to 50 nm. The adhesive layer 7 is a layer for strengthening an adhesive force of the first soft magnetic layer 2 with respect to the substrate 1 and, therefore, if the adhesive force of the first soft magnetic layer 2 to the substrate 1 is sufficiently ensured, it is not necessarily provided.

The thickness of each soft magnetic layer can be changed by changing the discharge power or discharge time when sputtering the soft magnetic layer.

In order to ensure the adhesive force to the substrate 1 made of the glass such as the amorphous glass, the first soft magnetic layer 2 is preferably made of an amorphous material. Further, the first soft magnetic layer 2 is desirably made of a material having suitable soft magnetic properties and, for example, is desirably made of a cobalt (Co)-based soft magnetic material. Among cobalt (Co)-based soft magnetic materials, a material such as a cobalt-zirconium (Co—Zr)-based alloy, a cobalt-tantalum-zirconium (Co—Ta—Zr)-based alloy, or a cobalt-niobium-zirconium (Co—Nb—Zr)-based alloy is particularly preferable as a material that forms the first soft magnetic layer 2.

In the case where the adhesive layer 7 is provided, it is also preferably made of an amorphous material such as, for example, a chromium-titanium (Cr—Ti)-based alloy in order to ensure adhesive forces with respect to the substrate 1 made of the glass such as the amorphous glass and the first soft magnetic layer 2 made of the amorphous material. The thickness of the adhesive layer 7 is about 20 nm.

On the first soft magnetic layer 2 is formed the nonmagnetic layer 5. This nonmagnetic layer 5 is made of a nonmagnetic material such as ruthenium (Ru) and has a thickness of about 0.7 nm to 0.9 nm.

On the nonmagnetic layer 5 is formed the second soft magnetic layer 3. This second soft magnetic layer 3 can be formed as a layer equivalent to the first soft magnetic layer 2. That is, the second soft magnetic layer 3 is preferably made of an amorphous material. Further, the second soft magnetic layer 3 is desirably made of a material having suitable soft magnetic properties and, for example, is desirably made of a cobalt (Co)-based soft magnetic material. Among cobalt (Co)-based soft magnetic materials, a material such as a cobalt-zirconium (Co—Zr)-based alloy, a cobalt-tantalum-zirconium (Co—Ta—Zr)-based alloy, or a cobalt-niobium-zirconium (Co—Nb—Zr)-based alloy is particularly preferable as a material that forms the second soft magnetic layer 3.

This second soft magnetic layer 3 and the first soft magnetic layer 2 are magnetically antiparallel-coupled to each other due to the presence of the nonmagnetic layer 5 therebetween. The thickness of the second soft magnetic layer 3 is, like the first soft magnetic layer 2, about 40 nm to 50 nm. However, as will be described later, in order to cause the combined magnetic properties of the soft magnetic layers 2 and 3 to have a magnetic hysteresis, the thicknesses of the first and second soft magnetic layers 2 and 3 are different from each other and a difference in thickness therebetween is set to 10 nm or less.

On the second soft magnetic layer 3 is formed the perpendicular magnetic recording layer 4 through the nonmagnetic underlayer 6 therebetween. The nonmagnetic underlayer 6 is formed of tantalum (Ta) or the like and has a thickness of about 2 nm. The perpendicular magnetic recording layer 4 is made of a hard magnetic material having a hexagonal closest packed (hcp) crystal structure such as a cobalt-platinum (Co—Pt)-based alloy and is formed as a granular magnetic layer because of containing a nonmagnetic material such as chromium (Cr) or silicon dioxide ($SiO_2$). That is, in this perpendicular magnetic recording layer 4, the nonmagnetic material such as chromium (Cr) or silicon dioxide ($SiO_2$) is precipitated between magnetic grains so as to suppress or block exchange interaction between the magnetic grains. The perpendicular magnetic recording layer 4 has a thickness of about 15 nm and is formed by epitaxial growth (heteroepitaxial growth).

In this invention, the magnetic material forming the perpendicular magnetic recording layer 4 is not particularly limited as long as it is a hard magnetic material, but, as described above, the perpendicular magnetic recording layer 4 is preferably a granular magnetic layer, particularly a granular magnetic layer containing a cobalt (Co)-based ferromagnetic material. Since the cobalt (Co)-based ferromagnetic material has a magnetic anisotropy in the c-axis direction of the hexagonal closest packed (hcp) crystal structure, control is performed in the perpendicular magnetic recording layer 4 so that the c-axis is perpendicularly oriented with respect to the substrate plane. On the other hand, there is a problem that, in a material having a hexagonal closest packed (hcp) crystal structure, as the c-axis perpendicular orientation is promoted more, formation of nonmagnetic grain boundary portions for blocking or suppressing exchange interaction between magnetic grains is impeded more. Since it is possible to relax such an impeding factor and positively form nonmagnetic grain boundary portions in the granular magnetic layer containing the cobalt (Co)-based ferromagnetic material, it is suitable as a magnetic material for forming the perpendicular magnetic recording layer 4.

On the perpendicular magnetic recording layer 4 is formed a protective layer 8. This protective layer 8 is made of hydrogenated carbon or the like and has a thickness of about 5 nm.

The protective layer 8 is a layer for protecting the perpendicular magnetic recording medium from an impact by a non-illustrated magnetic head.

Further, a lubricating layer 9 is formed on the protective layer 8. This lubricating layer 9 is made of perfluoropolyether (PFPE) or the like and has a thickness of about 1 nm. The lubricating layer 9 is a layer for relaxing the impact by the non-illustrated magnetic head.

In the meantime, the first and second soft magnetic layers 2 and 3 are formed so as to be located between the substrate 1 and the perpendicular magnetic recording layer 4. By the provision of these soft magnetic layers 2 and 3, this perpendicular magnetic recording medium, is formed as a so-called two-layer type perpendicular magnetic recording medium. Therefore, in this perpendicular magnetic recording medium, a suitable magnetic circuit can be formed among the non-illustrated magnetic head, the perpendicular magnetic recording layer 4, and the soft magnetic layers 2 and 3 at the time of magnetic recording, so that it is possible to obtain an action wherein the soft magnetic layers 2 and 3 assist the magnetic recording based on the mirror image effect.

The soft magnetic layers 2 and 3 magnetically antiparallel-coupled to each other are formed with the magnetic properties substantially equal to each other and, due to the fact that both thicknesses differ from each other, the combined magnetic properties of the soft magnetic layers 2 and 3 have a magnetic hysteresis. In the case where third and subsequent soft magnetic layers are present, the combined magnetic properties of all the soft magnetic layers are configured to have a magnetic hysteresis.

Figure 2:
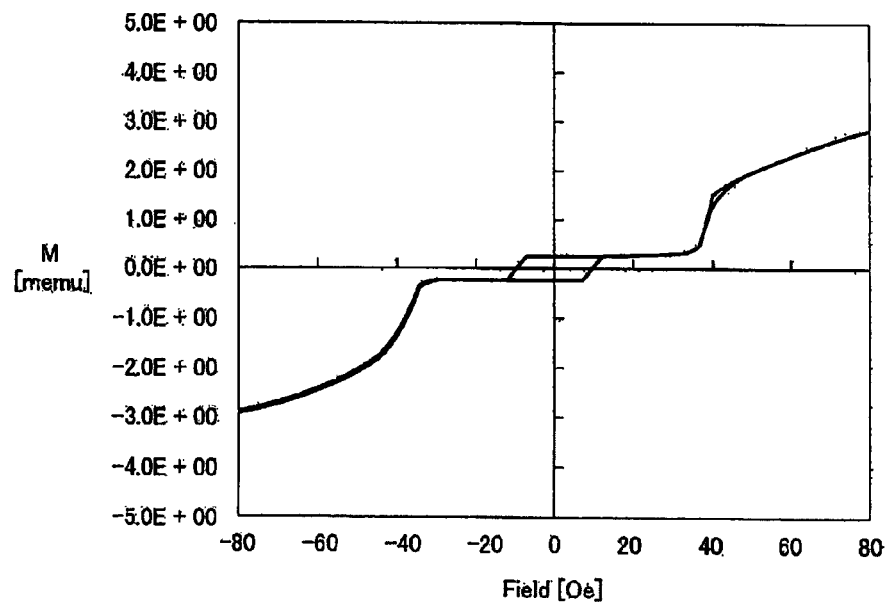
FIG. 2 is a graph (hysteresis curve) showing the magnetic properties of soft magnetic layers of the perpendicular magnetic recording medium according to this invention.

FIG. 2 is a graph (hysteresis curve) showing the magnetic properties of the soft magnetic layers of the perpendicular magnetic recording medium according to this invention.

If a magnetic field is applied to the soft magnetic layers 2 and 3 in a predetermined direction, the magnetization curves of the soft magnetic layers 2 and 3 shift in the magnetic field direction, respectively. Then, since coercive force Hc of the soft magnetic layers 2 and 3 derived from this magnetization curves is smaller than an exchange bias magnetic field (shift amount) Hex, the magnetization does not take a single value in a zero magnetic field, that is, as shown in FIG. 2, the hysteresis of the magnetization curve does not cross the zero magnetic field.

Figure 3:
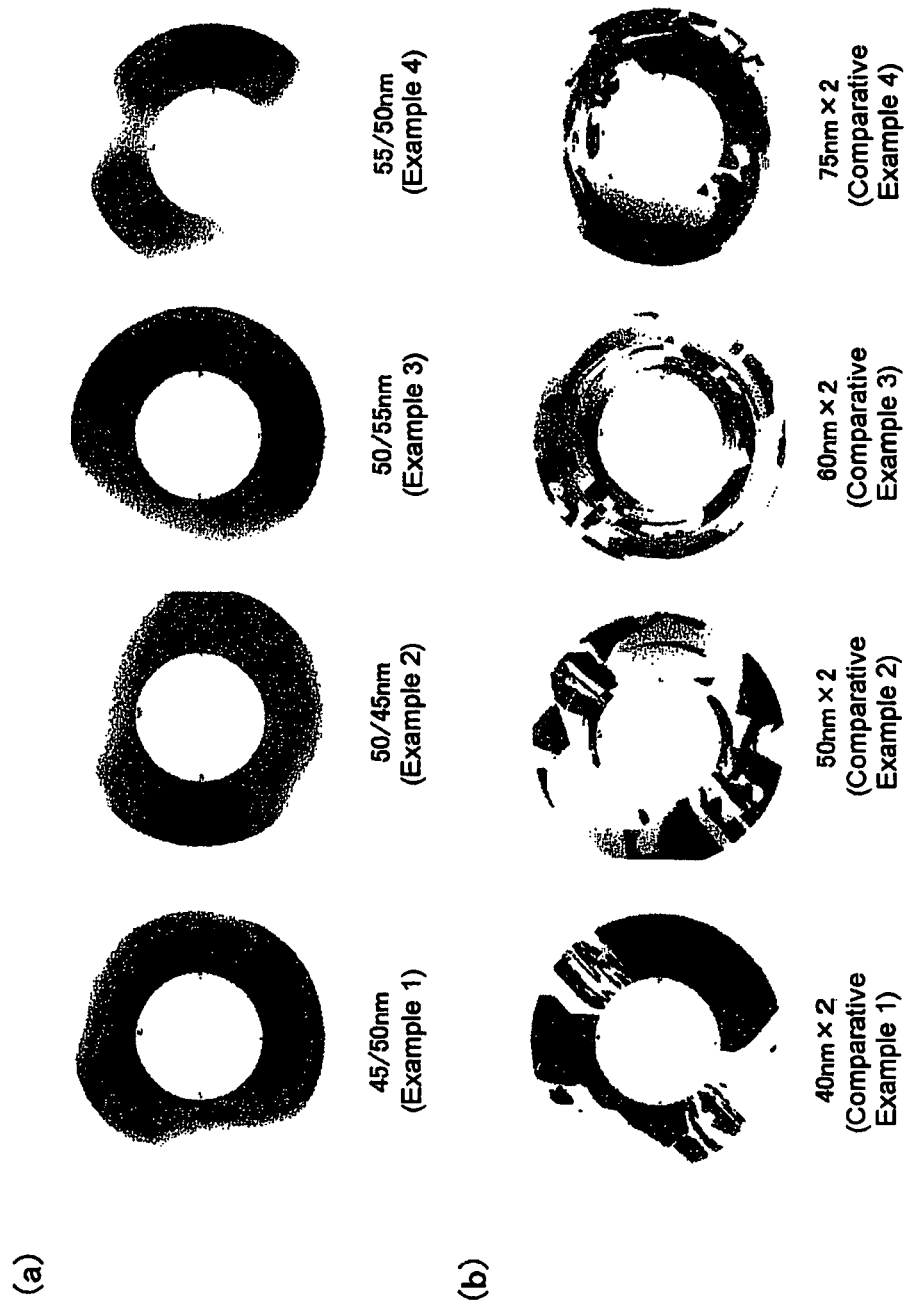
FIG. 3 is a plan view showing magnetic domain wall states in soft magnetic layers of perpendicular magnetic recording media according to this invention.

FIG. 3 is a plan view showing magnetic domain wall states in soft magnetic layers of perpendicular magnetic recording media according to this invention.

FIG. 3 shows the results of optically observing the soft magnetic layers by a measuring device using the Kerr effect, for example, an OSA (Optical Surface Analyzer). The OSA is a device using the fact that when the magnetization angle is changing, the polarization angle of light changes, and shows a magnetic domain wall portion to be a cause of spike noise and medium noise as discontinuous contrast.

Herein, distribution of magnetization directions at the medium surface was observed by an OSA (Optical Surface Analyzer) adapted to examine magnetization reversal using SMOKE (Surface Magnet Optical Kerr Effect).

Since the soft magnetic layers 2 and 3 have such magnetic properties, the exchange bias magnetic field (shift amount) Hex of the soft magnetic layers 2 and 3 increases, so that, as shown at (a) in FIG. 3, in the soft magnetic layers 2 and 3, there is formed a magnetic domain continuous over substantially the entire surface of the perpendicular magnetic recording medium and thus no magnetic domain wall is formed. On the other hand, (b) in FIG. 3 shows the state where magnetic domains are discontinuous and thus magnetic domain walls are formed in the soft magnetic layers.

The thicknesses of the soft magnetic layers 2 and 3 are preferably about 40 nm to 50 nm, respectively, or smaller and a difference between these thicknesses is preferably 10 nm or less. Either of the soft magnetic layers 2 and 3 may be thicker than the other.

EXAMPLES

Hereinbelow, Examples of this invention will be described in detail while citing Comparative Examples.

In each of the Examples, an amorphous aluminosilicate glass was molded into a disk shape by direct press, thereby producing a glass disk. This glass disk was ground, polished, and chemically strengthened in order, thereby obtaining a smooth nonmagnetic substrate in the form of a chemically strengthened glass disk.

The surface roughness of the main surface portion of this substrate was measured by an atomic force microscope (AFM) and it was a smooth surface shape with Rmax being 4.8 nm and Ra being 0.42 nm. Notation of Rmax and Ra follows the Japanese Industrial Standard (JISB0601).

Using an evacuated film forming apparatus, an adhesive layer 7, a first soft magnetic layer 2, a nonmagnetic layer 5, a second soft magnetic layer 3, and a nonmagnetic underlayer 6 were formed in order on the thus obtained disk substrate in an argon gas (Ar) atmosphere according to the DC magnetron sputtering method. The pressure of the argon gas was set to 4.5 mTorr.

The adhesive layer 7 was formed so as to be a chromium (Cr)-based amorphous layer having a thickness of 20 nm. Specifically, the adhesive layer 7 was formed using an amorphous chromium-titanium (Cr—Ti) alloy target.

The first soft magnetic layer 2 was formed using a cobalt-zirconium-tantalum alloy target so as to be an amorphous cobalt-tantalum-zirconium (Co—Ta—Zr) (Co: 88 at %, Ta: 7 at %, Zr: 5 at %) alloy layer. This cobalt-zirconium-tantalum alloy is a soft magnetic substance exhibiting soft magnetic properties.

There were formed the first soft magnetic layers 2 with four kinds of thickness, i.e. thickness 45 nm (Example 1), thickness 50 nm (Example 2), thickness 50 nm (Example 3), and thickness 55 nm (Example 4).

Then, the nonmagnetic layer 5 was formed using a ruthenium metal target so as to be a nonmagnetic ruthenium (Ru) metal layer of a hexagonal closest packed (hcp) crystal structure having a thickness of 0.7 to 0.9 nm.

The second soft magnetic layer 3 was formed, like the first soft magnetic layer 2, using a cobalt-zirconium-tantalum alloy target so as to be an amorphous cobalt-tantalum-zirconium (Co—Ta—Zr) (Co: 88 at %, Ta: 7 at %, Zr: 5 at %) alloy layer.

There were formed the second soft magnetic layers 3 with four kinds of thickness, i.e. thickness 50 nm (Example 1), thickness 45 nm (Example 2), thickness 55 nm (Example 3), and thickness 50 nm (Example 4). Therefore, a difference (|T1−T2|) between the thickness (T1) of the first soft magnetic layer 2 and the thickness (T2) of the second soft magnetic layer 3 was set to 5 nm in any of the Examples 1 to 4.

Then, the nonmagnetic underlayer 6 was formed using a tantalum metal target so as to be a nonmagnetic tantalum (Ta) metal layer having a thickness of 2 nm.

Part of each of the magnetic recording medium substrates each finished with the film formation up to the nonmagnetic underlayer 6 as described above was taken out and the surface roughness thereof was measured by the atomic force microscope (AFM), then it was a smooth surface shape. Further, the magnetic properties of the magnetic recording medium substrate of each of the Examples were measured and it was confirmed that suitable soft magnetic properties were exhibited. Further, a magnetic field was applied in a radial direction with respect to the magnetic recording medium substrate of each of the Examples to measure a hysteresis of a magnetization curve, and then the hysteresis was observed. Further, it was also confirmed that remanent magnetization remained when the applied magnetic field was removed. Then, it was confirmed that, in the magnetic recording medium substrate of each of the Examples, there was formed a magnetic domain continuous over substantially the entire surface thereof and thus no magnetic domain wall was formed.

Then, a perpendicular magnetic recording layer 4 was formed on each of the magnetic recording medium substrates. That is, the film formation was carried out using a target of a hard magnetic substance in the form of a cobalt-chromium-platinum-silicon dioxide (Co—Cr—Pt—($SiO_2$))-based alloy ((Co: 64 at %, Cr: 16 at %, Pt: 20 at %): 92 mol %-$SiO_2$: 8 mol %) so as to form the perpendicular magnetic recording layer 4 of a hexagonal closest packed (hcp) crystal structure having a thickness of 15 nm. The material forming the perpendicular magnetic recording layer 4 is an alloy granular material.

At least in the formation of the perpendicular magnetic recording layer 4, the pressure of an argon gas is preferably set to 10 mTorr or more.

Then, by sputtering a carbon target using a mixed gas containing 30% hydrogen in argon (Ar), a protective layer 8 made of hydrogenated carbon and having a thickness of 5 nm was formed. Because of being made of hydrogenated carbon, the protective layer 8 has sufficient film hardness and thus can protect the perpendicular magnetic recording layer 4 from an impact by a magnetic head.

Then, on this protective layer 8, a lubricating layer 9 made of perfluoropolyether (PFPE) was formed by the dip coating method. The thickness of the lubricating layer 9 was 1 nm.

Through the manufacturing processes as described above, perpendicular magnetic recording media as magnetic disks were fabricated.

It was confirmed that the perpendicular magnetic recording medium of each of the Examples had excellent properties that do not generate spike noise or medium noise when carrying out information recording and reproduction with respect to the perpendicular magnetic recording layer 4.

Comparative Examples

In Comparative Examples, magnetic recording medium substrates and perpendicular magnetic recording media were fabricated using the same materials and processes as those in the foregoing Examples, wherein, however, the thicknesses of first and second soft magnetic layers 2 and 3 were set equal to each other. The thicknesses of these soft magnetic layers 2 and 3 were set to 40 nm (Comparative Example 1), 50 nm (Comparative Example 2), 60 nm (Comparative Example 3), and 75 nm (Comparative Example 4), respectively.

In the Comparative Examples, the magnetic properties of the magnetic recording medium substrates each finished with film formation up to a nonmagnetic underlayer 6 were measured and it was confirmed that suitable soft magnetic properties were exhibited. However, when a magnetic field was applied in a radial direction with respect to each of the Comparative Examples to measure a hysteresis of a magnetization curve, it was confirmed that a zero magnetic field was resulted when the applied magnetic field was removed and thus no hysteresis was achieved. Then, it was confirmed that, in each of the Comparative Examples, magnetic domains were discontinuous and thus magnetic domain walls were formed.

On the magnetic recording medium substrate of each of the Comparative Examples, a perpendicular magnetic recording layer 4 which was the same as that of the foregoing Examples was formed and a protective layer 8 and a lubricating layer 9 were formed, thereby fabricating a perpendicular magnetic recording medium.

It was confirmed that the perpendicular magnetic recording medium of each of the Comparative Examples generated spike noise and medium noise when carrying out information recording and reproduction with respect to the perpendicular magnetic recording layer 4 and thus was inferior in properties to the perpendicular magnetic recording media of the foregoing Examples.

INDUSTRIAL APPLICABILITY

This invention is applied to a magnetic recording medium substrate for forming a perpendicular magnetic recording medium adapted to be mounted in a perpendicular magnetic recording type HDD (hard disk drive) or the like.

Further, this invention is applied to a perpendicular magnetic recording medium adapted to be mounted in a perpendicular magnetic recording type HDD (hard disk drive) or the like.

The invention claimed is:

1. A magnetic recording medium substrate comprising:
    a substrate made of a nonmagnetic material, and
    an underlayer formed on said substrate,
    wherein, said underlayer comprises at least a pair of soft magnetic layers laminated through a nonmagnetic layer therebetween and has a magnetic hysteresis,
    wherein said pair of soft magnetic layers are formed to have magnetic properties substantially equal to each other,
    wherein a thickness of each of said soft magnetic layers is less than 55 nm and one of said layers has a thickness different from that of the other layer, and
    wherein a difference between said thicknesses is 10 nm or less.

2. A magnetic recording medium substrate according to claim 1, characterized in that
    said soft magnetic layers are magnetically antiparallel-coupled to each other.

3. A perpendicular magnetic recording medium comprising:
    a substrate made of a nonmagnetic material,
    an underlayer formed on said substrate, and
    a recording layer formed on said underlayer
    wherein, said underlayer comprises at least a pair of soft magnetic layers laminated through a nonmagnetic layer therebetween and has a magnetic hysteresis,
    wherein said pair of soft magnetic layers are formed to have magnetic properties substantially equal to each other,
    wherein one of said layers has a thickness different from that of the other layer, and
    wherein a difference between said thicknesses is 10 nm or less.

4. A perpendicular magnetic recording medium according to claim 3 characterized in that
    said pair of soft magnetic layers are amorphous.

5. A perpendicular magnetic recording medium according to claim 3, wherein said soft magnetic layers are magnetically antiparallel-coupled to each other.

6. A magnetic recording medium substrate according to claim 1, wherein a soft magnetic layer comprises Co, Zr and Ta.

7. A magnetic recording medium substrate according to claim 1, wherein said non-magnetic layer has a thickness of less than 0.9 nm.

8. A magnetic recording medium substrate according to claim 1, wherein said non-magnetic layer comprises Ru.

9. A perpendicular magnetic recording medium according to claim 3, wherein a soft magnetic layer comprises Co, Zr and Ta.

10. A perpendicular magnetic recording medium according to claim 3, wherein said non-magnetic layer has a thickness of less than 0.9 nm.

11. A perpendicular magnetic recording medium according to claim 3, wherein said non-magnetic layer comprises Ru.

12. A perpendicular magnetic recording medium according to claim 3, wherein said medium has an areal information recording density of 100 GHbits/inch$^2$ or more.

13. A perpendicular magnetic recording medium according to claim 3, wherein a magnetic domain is formed that is continuous over substantially an entire surface of the perpendicular magnetic recording medium.

\* \* \* \* \*